United States Patent [19]
Kilk et al.

[11] Patent Number: 5,486,013
[45] Date of Patent: Jan. 23, 1996

[54] SLED CONSTRUCTION AND STRAP ASSEMBLY THEREFOR

[75] Inventors: Rein Kilk, Tartu, Estonia; Madis Idarand, Providence, R.I.

[73] Assignee: Pindi International, Ltd., Tartu, Estonia

[21] Appl. No.: 323,548

[22] Filed: Oct. 17, 1994

[51] Int. Cl.[6] .................................................. B62B 13/00
[52] U.S. Cl. ............................................................ 280/18.1
[58] Field of Search ................................. 280/845, 14.2, 280/18, 18.1, 19, 21.1

[56] References Cited

U.S. PATENT DOCUMENTS

| | | | |
|---|---|---|---|
| 2,219,905 | 10/1940 | Prickman | 280/12 |
| 3,123,374 | 3/1964 | MacLeod | 280/14.2 X |
| 3,637,230 | 1/1972 | Poik | 280/12 |
| 3,708,799 | 1/1973 | Smithdeal | 2/46 |
| 3,901,526 | 8/1975 | Scott et al. | 280/18.1 |
| 4,413,832 | 11/1983 | Pendleton | 280/12 |
| 4,657,266 | 4/1987 | Bohme | 280/18 |
| 4,735,423 | 4/1988 | Foss | 280/18 |
| 4,909,524 | 3/1990 | Paine | 280/18 |
| 5,401,048 | 3/1995 | Hopkins | 280/18.1 X |

Primary Examiner—Margaret A. Focarino
Assistant Examiner—Michael Mar
Attorney, Agent, or Firm—Salter & Michaelson

[57] ABSTRACT

A sled construction consists of a generally concave sled which conforms to the buttocks of the sledder and a strap assembly for releasably securing the sled to the body of the sledder. A body portion of the concave sled includes an inner contoured surface which is received in conforming relation with the buttocks of a sledder and a outer surface having longitudinal runners extending downwardly therefrom. The sides of the body portion taper inwardly and curve upwardly to form symmetrical triangular wing portions which extend around the hips of the sledder. The front of the body portion tapers inwardly and curves upwardly to form an apex received adjacent to the crotch of the sledder. A substantially planar flange portion extends outwardly from the back of the body portion so that it is received adjacent a waist of the sledder. The body portion includes a lateral slot adjacent to the apex and the flange portion includes two symmetrically spaced slots therein. The strap assembly includes a strap which is threaded through the slots so as to extend around the legs and waist of the sledder. Fastening device releasably fasten opposite ends of the strap together and provides for adjustment of the length of the strap.

12 Claims, 3 Drawing Sheets

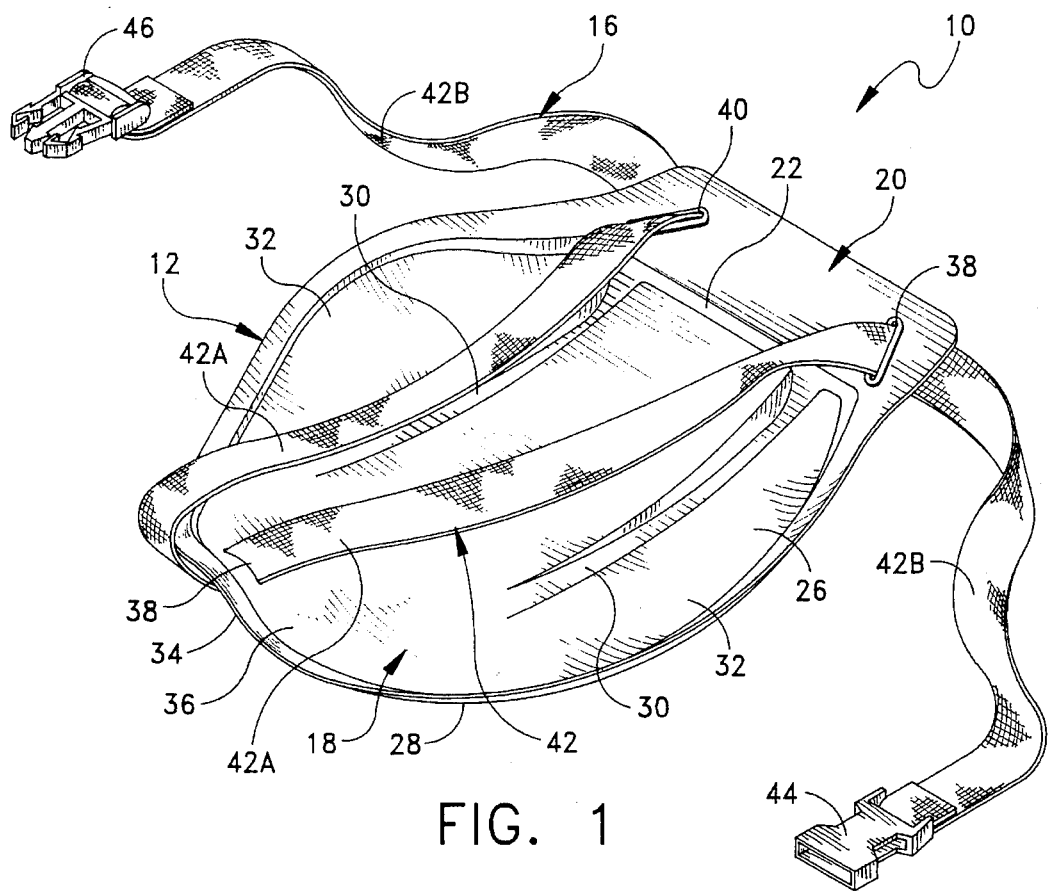
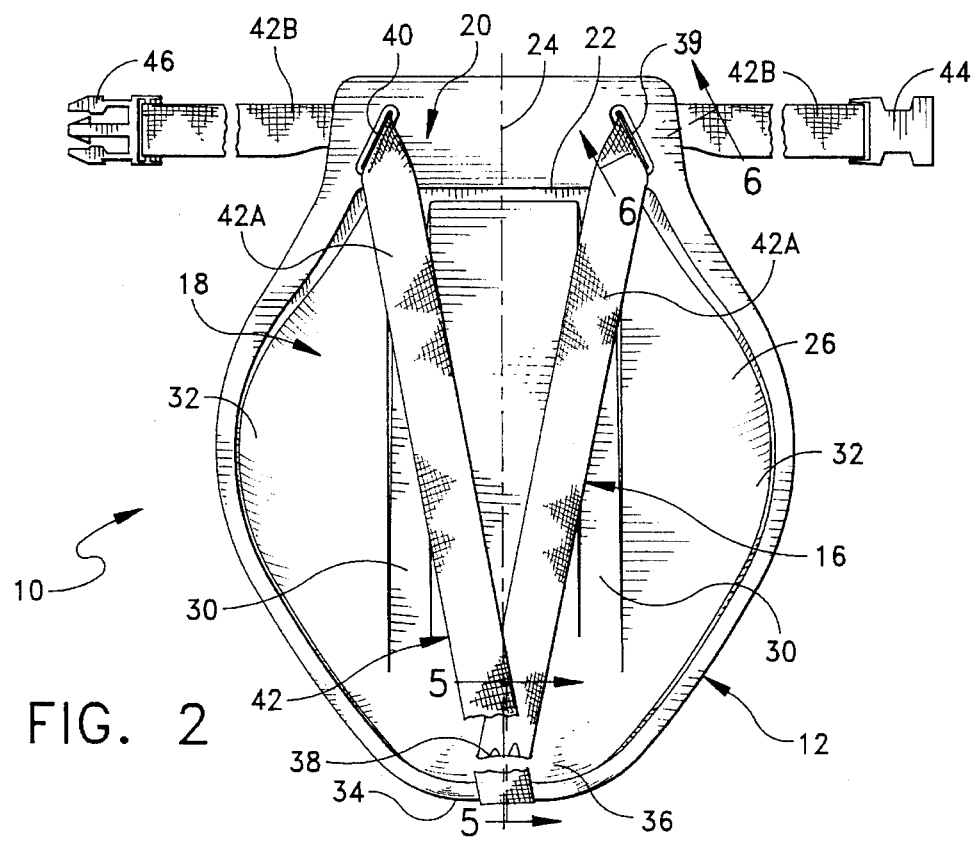
FIG. 1
FIG. 2

5,486,013

SLED CONSTRUCTION AND STRAP ASSEMBLY THEREFOR

BACKGROUND AND SUMMARY OF THE INVENTION

The instant invention relates to sled or lugs type devices for sliding on snow or ice, and more particularly to a sled construction which is worn on the buttocks of a sledder and is secured to the sledder with a strap assembly.

Sledding on ice or snow is a winter activity which is enjoyed by people of all ages. In this connection, there are available a wide variety of sledding devices upon which a sledder may sit, stand or lie face down to sled down a hill. For example, sledding devices of this type are disclosed in the U.S. Patents to Poik U.S. Pat. No. 3,637,230; Foss U.S. Pat. No. 4,735,423; Pendleton U.S. Pat. No. 4,413,832; Smithdeal U.S. Pat. No. 3,708,799; Paine U.S. Pat. No. 4,909,524; Prickman U.S. Pat. No. 2,219,905; and Bohme U.S. Pat. No. 4,657,226. While the available devices provide smooth and comfortable rides down the hill, in most instances they invariably have one significant drawback. Once the sledder reaches the bottom of the hill, the sledder must drag the sledding device back up the hill for another run. When the sledding device is large, such as a toboggan, returning the device to the top of the hill may require the efforts of two or more people. Even with a smaller device, ascending a steep, or ice covered hill may pose problems because carrying the sled requires the use of at least one hand Which then cannot be used to steady the sledder's balance while climbing. Another drawback of conventional sledding devices is that they are free to run down the hill unattended in the event that the sledder falls off the sledding device during use. Runaway sleds pose a significant safety risk to other sledders and are often the cause of serious injuries.

Although the patents to Poik U.S. Pat. No. 3,637,230 and Foss U.S. Pat. No. 4,735,423 do disclose articles that are attachable to the user for sliding purposes, the articles as illustrated are impractical to use and in the case of Foss, the article does not properly conform to the seat of the user. Poik on the other hand, is defined by shorts that are placed over the user's lower body portion and because of the nature of the material the shorts are more subject to wear and further are not suitable for sliding over a period of time.

Accordingly, among the objects of the instant invention are: the provision of a sledding device which conforms to the shape of the buttocks of a sledder; the provision of a sledding device which is releasably secured to the sledder's body; the provision of a sledding device that can be worn on the body when walking or climbing the sledding hill; and the provision of a sledding device which is safe, inexpensive, compact in size, easy to steer, and faster than conventional sleds.

The instant sled construction comprises a flexible sled which conforms to the shape of the buttocks of the sledder and a strap assembly for releasably securing the sled to the body of the sledder. The sled comprises a generally concave body portion and a substantially planar flange portion. The concave body portion of the sled lncludes an inner contoured surface which is received in conforming relation with the buttocks of a sledder and an outer surface having longitudinal runners extending downwardly therefrom. The sides of the body portion curve around the hips of the sledder. The front of the body portion tapers inwardly to an apex received adjacent to the crotch of the sledder. When the sled is positioned on the sledder's buttocks, the flange portion is received adjacent to the waist of the sledder and extends substantially parallel to the spine of the sledder. The body portion further includes a lateral slot adjacent the apex thereof, and the flange portion includes two symmetrically spaced slots therein. The strap assembly includes a strap which is threaded through the slots so as to extend around the legs and waist of the sledder. A fastening device releasably fastens opposite ends of the strap together and provides for length adjustment of the strap.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective view of the instant sled construction;

FIG. 2 is a top view thereof;

DESCRIPTION OF THE PREFERRED EMBODIMENT

Figure 3:
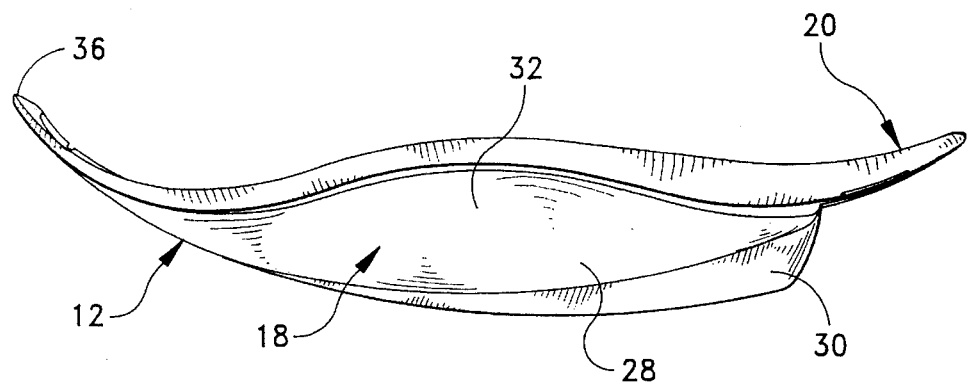
FIG. 3 is a side view thereof with the strap removed for purpose of illustration.

Referring now to the drawings, the sled construction of the instant invention is illustrated and generally indicated at 10 in FIGS. 1–3. As will hereinafter be more fully described, the instant sled construction comprises a contoured, flexible sled generally indicated at 12 which conforms to the shape of a sledder's buttocks 14 (FIG. 4), and further comprises a strap assembly generally indicated at 16 which is operative for releasably securing the sled 12 to the sledder's body.

Sled 12 preferably comprises an integral molded structure which is formed from a stiff, yet resilient plastic, such as polypropylene. Sled 12 includes a generally concave body portion generally indicated at 18, and a substantially planar flange portion generally indicated at 20 extending from a rear end 22 of body portion 18. Body portion 18 and flange portion 20 are symmetrical about a longitudinal centerline 24 (FIG. 2). Body portion 18 includes an inner contoured surface 26 which is received in conforming relation with buttocks 14 of a sledder and an outer surface 28 having longitudinal runners 30 extending downwardly therefrom. Runners 30, which are preferably integrally formed with the sled 12, provide steering and increase sledding speed. The sides of body portion 12 curve upwardly and taper inwardly to form symmetrical triangular wing portions 32 which extend around the hips of the sledder for a snug conforming fit. The front end 34 of body portion 12 tapers inwardly and curves upwardly to form an apex 36 which is received adjacent to the crotch of the sledder. When sled 12 is received on the buttocks 14 of the sledder, flange portion 20 is positioned adjacent the waist of the sledder and extends substantially parallel to the spine of the sledder (See FIG. 4). In order to attach the strap assembly 16 to sled 12, body portion 18 and flange portion 20 include slot-like openings.

More specifically, body portion 18 includes a lateral slot 38 at apex 36, and flange portion 20 includes two symmetrically spaced slots 39, 40. Slots 39, 40 in flange portion 20 are preferably equally spaced on either side of centerline 24 and are preferably angled inwardly and rearwardly (See FIG. 2).

Figure 5:
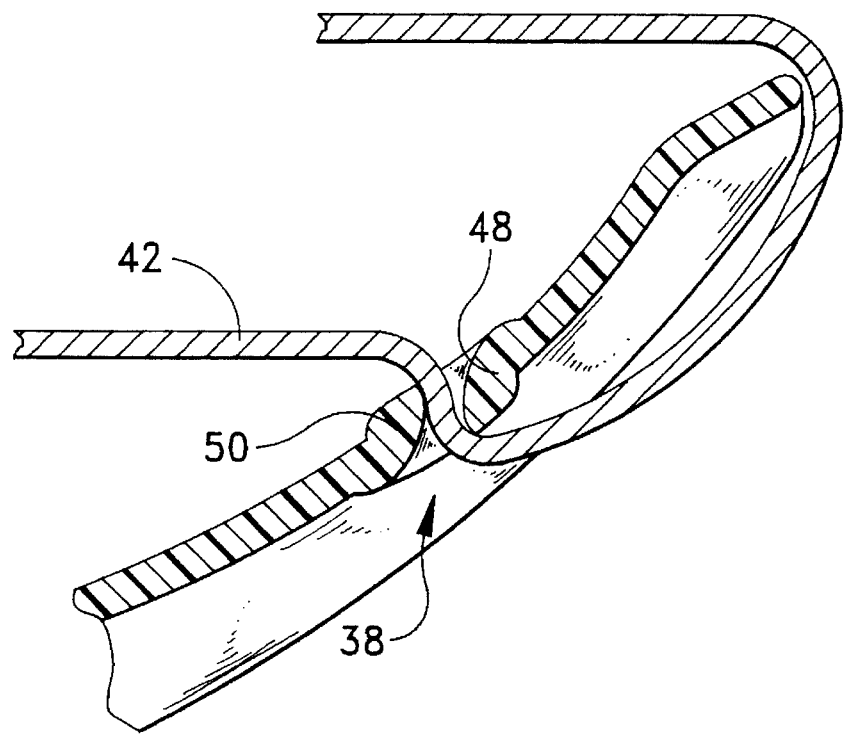
FIG. 5 is a cross-sectional view taken along line 5—5 of FIG. 2.
Figure 6:
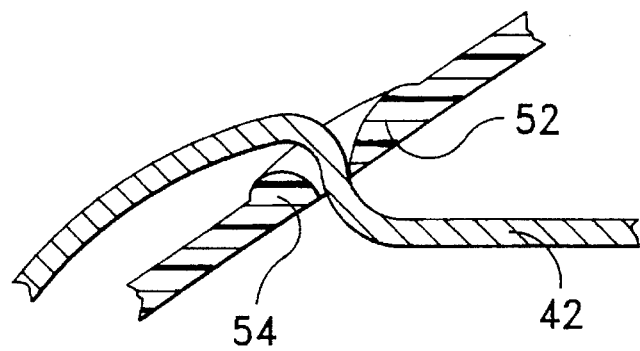
FIG. 6 is a cross-sectional view taken along line 6—6 of FIG. 2.

Strap assembly 16 comprises an elongated strap generally indicated at 42 and interlocking fastening devices 44, 46 for releasably fastening opposite ends of strap 42 together. Strap 42 preferably comprises a flat web-type material. However, it is to be understood that other types of webbing, or round cord are also suitable. Fastening devices 44, 46 preferably comprise interlocking side-release buckles as illustrated in the drawing figures. However, similar locking devices which enable releasable closure and convenient adjustment of the length of strap 42 to accommodate the size of the sledder are also suitable. Strap 42 is preferably threadedly received through slots 38, 39, 40 in sled 12 as illustrated in FIGS. 1 and 2. More specifically, strap 42 is first threaded through slot 39 in flange portion 20, then through slot 38 in body portion 18, and then through slot 40 in flange portion 20. In order to frictionally hold strap 42 in assembled relation with sled 12, slot 38 is provided with tapered front and rear edges 48 and 50 respectively (See FIG. 5). More specifically front edge 48 tapers downwardly and rear edge 50 tapers upwardly so that when strap 42 is pulled tightly, the strap 42 frictionally engages the edges 48 and 50 and is held in position. Slots 39 and 40 are each provided with a tapered outer edge 52 and a rounded inner edge 54 (See FIG. 6). When strap 42 is pulled tight, the strap 42 frictionally engages the tapered outer edge 52 to frictionally hold it in position. Slots 38, 39 and 40 are preferably slightly wider than the strap 42 to provide easy adjustment of the strap 42.

Figure 4:
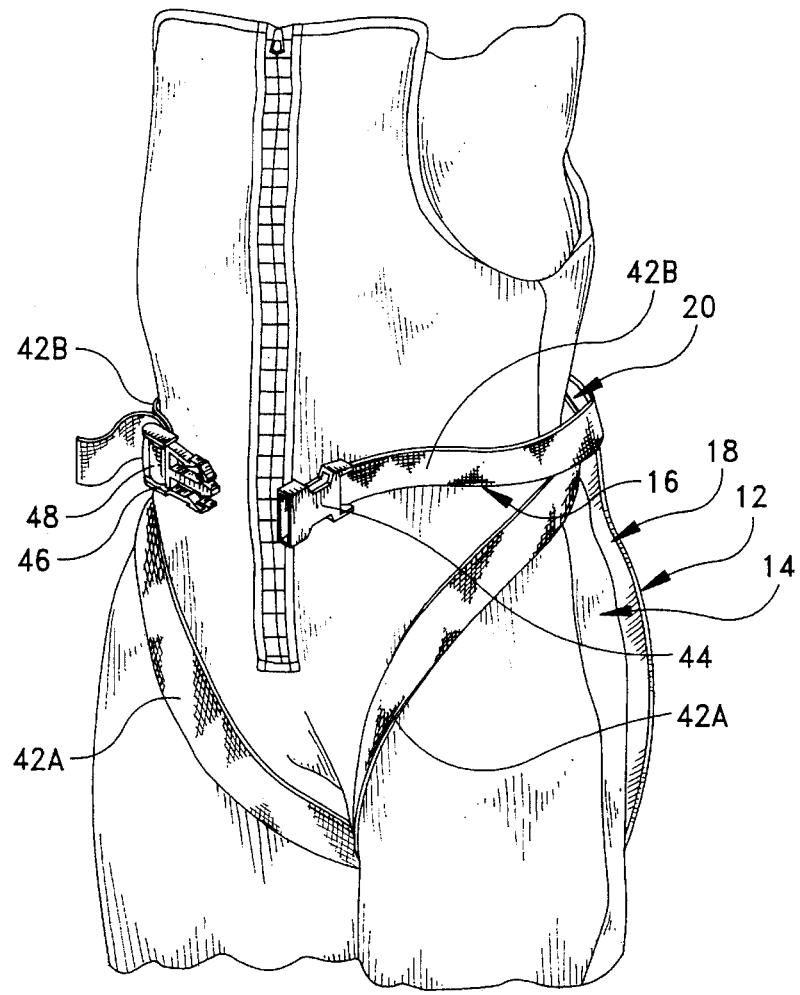
FIG. 4 is another perspective view thereof shown in mounted relation on the buttocks of a sledder.

Referring now to FIG. 4, the sled construction 10 is illustrated in mounted relation on a sledder. In this regard, the sledder steps through the openings created by strap 42 and sled 12 so that the strap portions 42A extend over the inner portions of the sledder's thighs (FIG. 4). The free ends 42B of strap 42 are then extended around the sledder's waist (See FIG. 4) and the buckles 44, 46 snapped together in locking relation. The length of the strap 42 can then be adjusted as provided for by buckle 46. In the instant embodiment, side-release buckle 46 includes conventional friction slide arrangement 48 (See FIG. 4).

It can therefore be seen that the instant invention provides a unique and improved personal sled construction 10 which is compact, safe and releasably secured to the sledder. The sled 12 snugly conforms to the buttocks of the sledder so that the sledder can continue to wear the sled 12 while walking or climbing. The integral runners 30 provide steering capability and increase sledding speed by reducing surface contact area of the sled 12. The threading arrangement of strap 42 provides a secure arrangement, similar to a parachute harness, which is both comfortable and safe for securely affixing the sled to the body of the sledder. The tapered edges of strap slot 38, 39 and 40 provide friction locking for maintaining strap 42 in position with respect to the sled 12 when in use. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

We claim:

1. A sled construction comprising:

a sled including a generally concave body portion and a substantially planar flange portion which extends from a first end of said body portion, said body portion including an inner contoured surface which is received in conforming relation with the buttocks of a sledder and an outer surface having longitudinal runners extending downwardly therefrom, said body portion further including a second end opposite said first end which tapers inwardly and curves upwardly to form an apex received adjacent to a crotch of the sledder, said flange portion being received adjacent a waist of the sledder, said body portion still further including an opening adjacent said apex, said flange portion including two spaced openings therein; and a strap assembly including a single strap and a fastening device for releasably fastening opposite ends of the strap together, said strap being threadedly received through said openings in said body portion and said flange portion and said strap extending around the thighs and the waist of the sledder for securing the sled thereto.

2. In the sled construction of claim 1, said body portion including symmetrical wing portions on opposite sides thereof which taper inwardly and curve upwardly.

3. In the sled construction of claim 1 said openings in said body portion and said flange portion comprising slots, said slot adjacent to said apex extending perpendicular to said longitudinal runners.

4. In the sled construction of claim 3, said slots having a width which is greater than a width of said strap.

5. In the sled construction of claim 4, said slot adjacent said apex having tapered front and rear edges.

6. In the sled construction of claim 5, said front edge tapering downwardly, said rear edge tapering upwardly.

7. In the sled construction of claim 1, said strap being first received through one of said openings in said flange portion, through said opening in said body portion and through said other opening in said flange portion.

8. A sled construction comprising:

a sled including a generally concave body portion having a longitudinal centerline and a substantially planar flange portion which extends outwardly from a first end of said body portion, said body portion including an inner contoured surface which is received in conforming relation with the buttocks of a sledder and a outer surface having longitudinal runners extending downwardly therefrom, said body portion further including symmetrical wing portions on opposite sides thereof which taper inwardly and curve upwardly, said body portion further including a second end opposite said first end which tapers inwardly and curves upwardly to form an apex received adjacent a crotch of the sledder, said flange portion being received adjacent a waist of the sledder, said flange portion extending from said body portion so as to lie substantially parallel to a spine of said sledder when mounted, said body portion still further including an opening adjacent said apex, said flange portion including two symmetrically spaced openings therein; and a strap assembly including a single strap and a fastening device for releasably fastening opposite ends of the strap together, said strap being threadedly received through said openings in said body portion and said flange portion and said strap extending around the thighs and the waist of the sledder for securing the sled thereto.

9. In the sled construction of claim 8, said openings in said body portion and said flange portion comprising slots, said slot adjacent said apex extending perpendicular to said longitudinal runners.

10. In the sled construction of claim 9, said slots having a width which is greater than a width of said strap.

11. In the sled construction of claim 10, said slot adjacent said apex having tapered front and rear edges.

12. In the sled construction of claim 11, said front edge tapering downwardly, said rear edge tapering upwardly.

* * * * *